(12) United States Patent
Akinyemi

(10) Patent No.: US 9,990,378 B2
(45) Date of Patent: Jun. 5, 2018

(54) OPPORTUNISTIC CLEARING OF SYNC STATES ASSOCIATED WITH A DATABASE

(75) Inventor: Adedeji Olumuyiwa Akinyemi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1081 days.

(21) Appl. No.: 13/534,218

(22) Filed: Jun. 27, 2012

(65) Prior Publication Data

US 2014/0006348 A1 Jan. 2, 2014

(51) Int. Cl.
*G06F 17/30* (2006.01)

(52) U.S. Cl.
CPC .. *G06F 17/30289* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 6,256,634 B1 * | 7/2001 | Moshaiov | G06F 17/30008 |
| 6,711,578 B1 * | 3/2004 | McCaw et al. | |
| 7,203,966 B2 * | 4/2007 | Abburi | G06F 21/10 380/201 |
| 7,290,019 B2 | 10/2007 | Bjorner | |
| 7,752,166 B2 | 7/2010 | Quinlin | |
| 2004/0078370 A1 * | 4/2004 | Acree et al. | 707/8 |
| 2004/0078393 A1 * | 4/2004 | Acree et al. | 707/200 |
| 2007/0168516 A1 | 7/2007 | Liu | |
| 2008/0278740 A1 * | 11/2008 | Bird et al. | 358/1.15 |
| 2009/0077263 A1 | 3/2009 | Koganti | |
| 2010/0262958 A1 | 10/2010 | Clinton | |
| 2013/0179186 A1 * | 7/2013 | Birtwhistle et al. | 705/3 |

OTHER PUBLICATIONS

"Introduction to Microsoft Sync Framework"—Published Date: Oct. 2009 Proceedings: NA Author: NA Pages: NA http://msdn.microsoft.com/en-us/sync/bb821992.
"Making Microsoft Sync Framework work with PostgreSql"—Published Date: Mar. 18, 2011 Proceedings: NA Author: Roopesh Shenoy Pages: NA http://www.infoq.com/articles/Microsoft-Sync-Framework-PostgreSql.

(Continued)

*Primary Examiner* — Jau-Shya Meng

(57) ABSTRACT

Systems and techniques of the management of the metadata of a database are presented. A provider is in communication with a database and a set of consumers of the database. Data may be changed by addition, editing or deletion from the database and such changes are recorded and/or maintained by the provider on a list of changes. The changes on this list may be associated with a sync token. The provider may also maintain a list of consumers and associate with each consumer a last sync token which describes when the last sync request and update on the database was made with the consumer. Data which is deleted from the database is recorded with a tombstone. The tombstone is maintained on the list of changes until all consumers have been made aware of the deletion—then the tombstone may be deleted from the list of changes.

20 Claims, 8 Drawing Sheets

(56) References Cited

OTHER PUBLICATIONS

"A Java Framework for Mobile Data Synchronization"—Published Date: Sep. 6, 2000 Proceedings: Fifth IFCIS International Conference on Cooperative Information Systems, Lecture Notes in Computer Science 1901, Springer-Verlag Author: Norman H. Cohen pp. 287-298.

"Synchronization Services for ADO.NET"—Published Date: Oct. 29, 2010 Proceedings: NA Author: NA Pages: NA http://www.syncguru.com/projects/SyncServicesDemoTombstoneCleanup.aspx.

* cited by examiner

— 202

| Sync Token | Provider Sync Changes |
|---|---|
| 1 | FileA |
| 2 | FileB |
| 3 | FileC |
| 4 | FileD |
| 5 | FileE |

— 204

| Consumer Device | Last Sync Token | Last Sync Timestamp |
|---|---|---|
| Consumer A | 5 | 110 |
| Consumer B | 5 | 103 |
| Consumer C | 5 | 100 |

— 206

| Sync Token | Cons A Sync Changes |
|---|---|
| 1 | FileA |
| 2 | FileB |
| 3 | FileC |
| 4 | FileD |
| 5 | FileE |

— 208

| Sync Token | Cons B Sync Changes |
|---|---|
| 1 | FileA |
| 2 | FileB |
| 3 | FileC |
| 4 | FileD |
| 5 | FileE |

— 210

| Sync Token | Cons C Sync Changes |
|---|---|
| 1 | FileA |
| 2 | FileB |
| 3 | FileC |
| 4 | FileD |
| 5 | FileE |

| Sync Token | Provider Sync Changes |
|---|---|
| 5 | FileE |
| 6 | FileA – Tombstone |
| 7 | FileB – Tombstone |
| 8 | FileC- Edit |
| 9 | FileF |
| 10 | FileG |
| 11 | FileH |
| 12 | FileD - Tombstone |
| | |

204

| Consumer Device | Last Sync Token | Last Sync Timestamp |
|---|---|---|
| Consumer A | 5 | 110 |
| Consumer B | 5 | 103 |
| Consumer C | 5 | 100 |
| | | |

206

| Sync Token | Cons A Sync Changes |
|---|---|
| 1 | FileA |
| 2 | FileB |
| 3 | FileC |
| 4 | FileD |
| 5 | FileE |
| | |
| | |
| | |
| | |

208

| Sync Token | Cons B Sync Changes |
|---|---|
| 1 | FileA |
| 2 | FileB |
| 3 | FileC |
| 4 | FileD |
| 5 | FileE |
| | |
| | |
| | |
| | |

210

| Sync Token | Cons C Sync Changes |
|---|---|
| 1 | FileA |
| 2 | FileB |
| 3 | FileC |
| 4 | FileD |
| 5 | FileE |
| | |
| | |
| | |
| | |

| Sync Token | Provider Sync Changes |
|---|---|
| 5 | FileE |
| 6 | FileA – Tombstone |
| 7 | FileB – Tombstone |
| 8 | FileC - Edit |
| 9 | FileF |
| 10 | FileG |
| 11 | FileH |
| 12 | FileD - Tombstone |
| | |

204

| Consumer Device | Last Sync Token | Last Sync Timestamp |
|---|---|---|
| Consumer A | 12 | 205 |
| Consumer B | 12 | 213 |
| Consumer C | 5 | 100 |
| | | |

206

| Sync Token | Cons A Sync Changes |
|---|---|
| 5 | FileE |
| 6 | FileA – Tombstone |
| 7 | FileB – Tombstone |
| 8 | FileC - Edit |
| 9 | FileF |
| 10 | FileG |
| 11 | FileH |
| 12 | FileD - Tombstone |
| | |

208

| Sync Token | Cons B Sync Changes |
|---|---|
| 5 | FileE |
| 6 | FileA – Tombstone |
| 7 | FileB – Tombstone |
| 8 | FileC - Edit |
| 9 | FileF |
| 10 | FileG |
| 11 | FileH |
| 12 | FileD - Tombstone |
| | |

210

| Sync Token | Cons C Sync Changes |
|---|---|
| 1 | FileA |
| 2 | FileB |
| 3 | FileC |
| 4 | FileD |
| 5 | FileE |
| | |
| | |
| | |
| | |

| Sync Token | Provider Sync Changes |
|---|---|
| 5 | FileE |
| 8 | FileC - Edit |
| 9 | FileF |
| 10 | FileG |
| 11 | FileH |
| 12 | FileD - Tombstone |
| | |
| | |
| | |

204

| Consumer Device | Last Sync Token | Last Sync Timestamp |
|---|---|---|
| Consumer A | 12 | 205 |
| Consumer B | 12 | 213 |
| Consumer C | 10 | 429 |
| | | |

206

| Sync Token | Cons A Sync Changes |
|---|---|
| 5 | FileE |
| 8 | FileC - Edit |
| 9 | FileF |
| 10 | FileG |
| 11 | FileH |
| | |
| | |
| | |
| | |

208

| Sync Token | Cons B Sync Changes |
|---|---|
| 5 | FileE |
| 8 | FileC - Edit |
| 9 | FileF |
| 10 | FileG |
| 11 | FileH |
| | |
| | |
| | |
| | |

210

| Sync Token | Cons C Sync Changes |
|---|---|
| 5 | FileE |
| 8 | FileC - Edit |
| 9 | FileF |
| 10 | FileG |
| | |
| | |
| | |
| | |
| | |

| Sync Token | Provider Sync Changes |
|---|---|
| 5 | FileE |
| 8 | FileC- Edit |
| 9 | FileF |
| 10 | FileG |
| 11 | FileH |
| | |
| | |
| | |

204

| Consumer Device | Last Sync Token | Last Sync Timestamp |
|---|---|---|
| Consumer A | 12 | 205 |
| Consumer B | 12 | 213 |
| Consumer C | 12 | 504 |
| | | |

206

| Sync Token | Cons A Sync Changes |
|---|---|
| 5 | FileE |
| 8 | FileC- Edit |
| 9 | FileF |
| 10 | FileG |
| 11 | FileH |
| | |
| | |
| | |

208

| Sync Token | Cons B Sync Changes |
|---|---|
| 5 | FileE |
| 8 | FileC- Edit |
| 9 | FileF |
| 10 | FileG |
| 11 | FileH |
| | |
| | |
| | |

210

| Sync Token | Cons C Sync Changes |
|---|---|
| 5 | FileE |
| 8 | FileC – Edit |
| 9 | FileF |
| 10 | FileG |
| 11 | FileH |
| 12 | FileD - Tombstone |
| | |
| | |

FIG. 7

OPPORTUNISTIC CLEARING OF SYNC STATES ASSOCIATED WITH A DATABASE

BACKGROUND

Tombstones are place holders for content on a remote device that have been deleted. When sync state is sent to a device requesting the current state of data held therein, the tombstone information, in addition to other data, such as newly added files or folders, or edited files, should be sent across as well, so that the remote device has an accurate representation of the latest sync state. An issue arises, however with respect to how long to hold on to tombstone data. The source device no longer has the content the tombstones refer to and—other than the fact that remote devices should be made aware of the deletions—has no reason to hold on to them. Each tombstone occupies a finite amount of space with respect to temporary and/or persistent storage; increases processing costs as each tombstone element is one more item that should be processed when servicing a sync state query request; and also increases the network transferal/communications by utilizing precious bandwidth space.

The most common scenario for mitigating this issue is the use of an expiration timer. After a set amount of time, tombstones are simply purged from the sync state database (DB). However, until the time of the purge, the DB may be holding tombstone state needlessly, thus, contributing to increased runtime costs. In addition, there may be a risk that the DB may be purged of tombstones prematurely—which may lead to sync state holes—or that the entire sync state DB has to be transferred to ensure that the consumer has an accurate representation of the device's sync state. Based upon the size of the DB, the latter's cost may be prohibitive.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and techniques of the management of the metadata of a database are presented. A provider is in communication with a database and a set of consumers of the database. Data may be changed by addition, editing or deletion from the database and such changes are recorded and/or maintained by the provider on a list of changes. The changes on this list may be associated with a sync token. The provider may also maintain a list of consumers and associate with each consumer a last sync token which describes when the last sync request and update on the database was made with the consumer. Data which is deleted from the database is recorded with a tombstone. The tombstone is maintained on the list of changes until all consumers have been made aware of the deletion—then the tombstone may be deleted from the list of changes.

In one embodiment, a method for managing the metadata of a database is disclosed. The database may comprise a set of data, each said data capable of being added, changed and deleted from said database, and wherein said metadata managed by at least one provider. The provider is capable of communicating with a set of consumers and may perform the following: maintaining a list of changes to said database, said changes associated with a sync token; maintaining a list of consumers of said database, said list of consumers associated with a last sync token for each said consumer; adding a tombstone to said list of changes when data is deleted from said database, said tombstone having its associated sync token in said list of changes; reading a request for sync from one of said consumers; updating said one of said consumers with metadata added to said list of changes to said database since said last sync token; and if all consumers have been updated with said sync token associated with said tombstone, deleting said tombstone from said list of changes to said database.

In another embodiment, A system for managing the metadata of a database is disclosed. The system may comprise the following: a provider, said provider further comprising a processor and memory; a database, said database in communication with said provider and said provider is capable of maintaining a list of changes to said database and said provider is further capable of adding a tombstone for a data deleted from said database, said tombstone added to said list of changes to said database; wherein said provider is in communications with a set of consumers, said consumers requesting to sync with said database; and said provider is capable of maintaining a list of said consumers; and further wherein said provider is capable of deleting said tombstone when all consumers have been made aware of said deletion of said data.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 2 through 7 present one example of how a database evolves over time as a provider may be intermittently connecting with a set of consumers who are interested in the data items that are currently managed by the provider.

DETAILED DESCRIPTION

Figure 1:
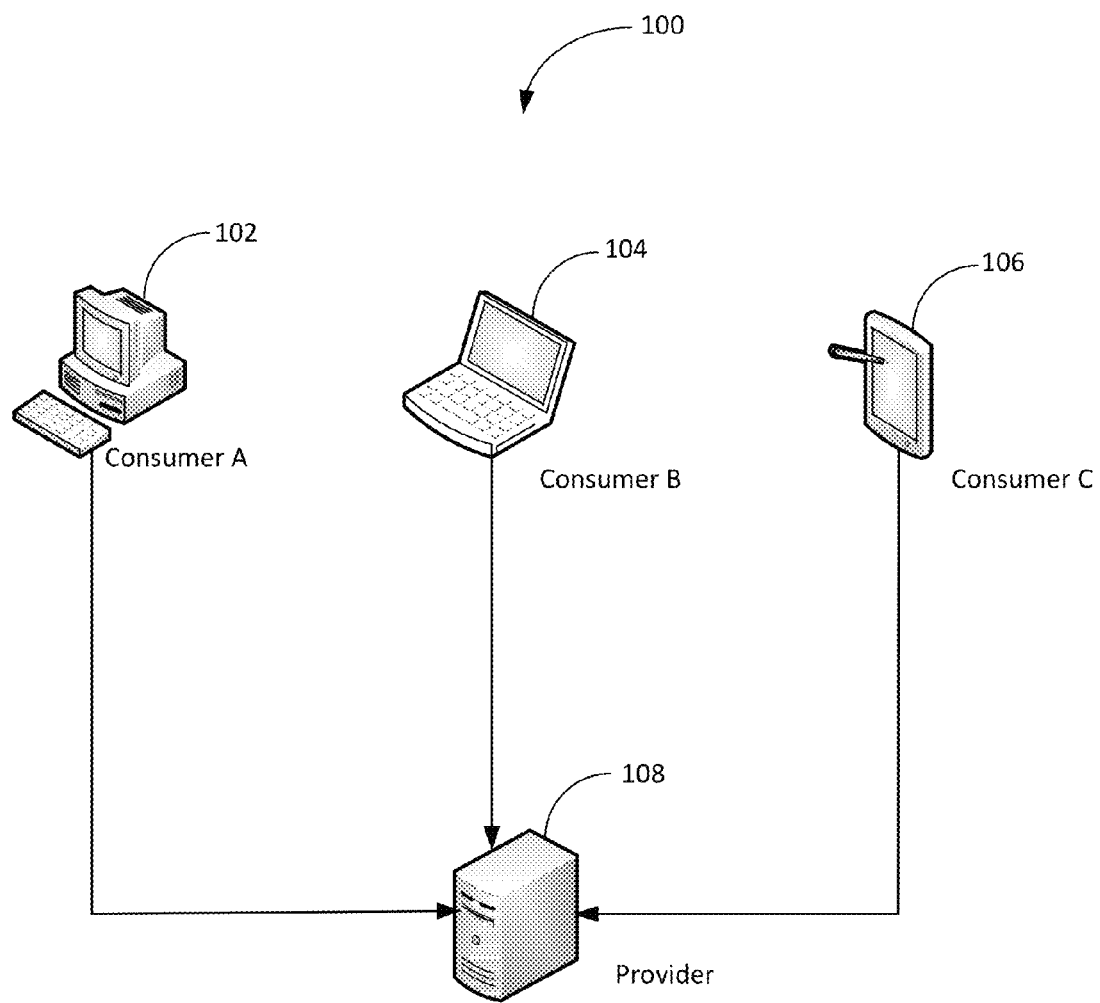
FIG. 1 illustrates an exemplary environment in which the systems and techniques of the present application may be operating.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

The sync state of a database may represent metadata of the database and the state of knowledge of what is in the database by consumers and the provider, as will be discussed in greater detail herein.

In one embodiment, it may be desirable to affect a strategy to avoid having to keep stale content tombstones—while limiting the probability that deleted tombstones may result in a device having an incomplete view of a remote device's sync state. This results in minimal storage bloat held by the DB, which translates to faster processing times, lower transmission bandwidth costs, and a minimal risk of a remote consumer device having to regenerate its view of the sync state due to the presence of holes in its view.

FIG. 1 is one exemplary environment 100—merely for expository purposes—to describe present embodiments of systems and/or methods. System 100, as depicted, comprises a plurality of consumers (Consumer A, B, C—102, 104 and 106 respectively). This plurality of consumers is placed into communication (in any manner known, e.g., wireless, wired, directly or indirectly, via the Internet, etc.) with at least one provider 108. Provider 108 may comprise a controller and a database, comprising any information that is of interest to the plurality of consumers, which may comprise sufficient controllers and memories themselves. It will be appreciated that the techniques, methods and systems may reside in many different environments—e.g., in multiple server/client environments, over the Internet and the like. The present application encompasses all of the potential environments in which these techniques, methods and/or systems might reside. In addition, it should be appreciated that the database may be hosted apart from the provider. In such a case, the provider may be in communication with the database remotely, as opposed to directly.

In one embodiment, the provider 108 acts as a data source device and/or server and keeps track of the most recent knowledge a remote device has of the sync state of consumers (e.g., target devices of the data or remote data consumers), and, possibly, along with a time stamp corresponding to when the device became aware of the knowledge. This record enables the explicit determination of what sync state all devices are aware of—e.g., such that all tombstones, that precede a given device sync state threshold, may be safely expunged without the risk of causing holes in the sync state provided to consumer devices.

In one embodiment, the combination of consumer device (unique ID of device that made a sync request), and the last sync time, in identifying deterministically what tombstones are stale, and what is safe to purge, in a multi device sync scenario is maintained and tracked.

For purposes of the present application, the following terms may take the following sense: "Consumer"—a device that makes requests for information on data that another remote possesses (e.g., a client); "Provider"—a device which processes and responds to requests made for data that it possesses (e.g., a server); "Sync Token"—an id, marker and/or mechanism that represents a data item in a data collection that is being sent from a provider to a consumer; "Sync Changes"—a collection of data items or mechanisms that comprises changes in the content or data being held by a provider; "Sync"—a process and/or mechanism of communicating sync changes from provider to consumer; "Data collection"—content being held by the provider and that is sent and/or served to the consumer. In some contexts, the data collection may comprise metadata of files being held by the provider; "Tombstone"—a representation, data item or mechanism that may correspond to an item in the provider's data collection that has been deleted or intended to be deleted. It will be appreciated that these terms may also take on different senses or meaning depending upon the context of their use herein.

In one embodiment, one or more client devices (e.g., consumers) attempt to mirror the state held by a server device (e.g., provider). To achieve this, consumers may dispatch requests at some specified frequency for a list of changes or the delta that may have taken place in the provider's data repository since the last time a request was made. A consumer—by continuously making requests and updating its local representation of the data held by the provider—may be able to achieve substantially a one-to-one equivalence of the provider's data collection.

There may be a plurality of primary classes of data items that make up the elements in a sync changes communication between a provider and consumer. Three of which may comprise:

(1) Newly added content

Data items in the sync changes collection that refer to new content that have been added to the provider since the last time the consumer issued a sync request.

(2) Edits to already existing content

Data items in the sync changes collection that refer to already existing content that the consumer is aware of which have been edited since the last time the consumer synced with the provider.

(3) Deletions of already existing content (tombstones)

This refers to those data items that correspond to content which have been deleted since the last time the consumer synced with the provider.

Data item 3 above differs from data items 1 and 2 in many aspects. For example, data items 1 and 2 map to concrete items, and newly connecting clients and/or customers should be made aware. By contrast, data item 3 may be considered an abstract construct, as there is no concrete item that backs it. In addition, if new devices come online, they have no need to know of deleted items, as they never existed from their perspective, and are thus more or less irrelevant to them. Thus it may be desirable to expunge the list of deleted items (tombstones), when possible, as they serve no useful purpose.

Functionality

Figure 2:
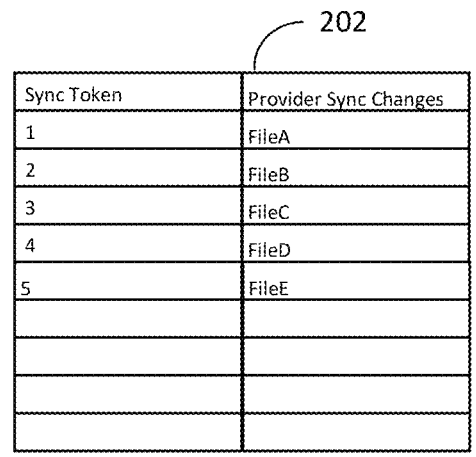

The provider may keep a list of the knowledge it has of its data collection in a sync token ordering. FIG. 2 depicts one such sync token ordering 202. As may be seen, in one embodiment, each change in the provider's memory (e.g., a database transaction) may be kept in a table format—e.g., FileA is added and/or maintained by Provider and indicated by Sync Token 1, FileB with Sync Token 2 and so on. It will be appreciated that other formats and database structures may suffice to maintain this level of information.

In this embodiment, each consumer device may attempt to get any sync changes that may have occurred since the last time the consumer synced with the provider. The consumer may present the provider a sync token that corresponds to the last item in the sync changes collection that the consumer received. This sync token may also correspond to a unique position of items, in the sync changes collection that the provider has. In this embodiment, the provider may return all sync changes that are greater than (e.g., occur after) the sync change corresponding to the sync token that the consumer gave in its request.

Whenever the provider communicates a list of sync changes to a consumer device, it may keep track of the sync token of the last item in the sync changes list that was sent to the device, along with the id of the device, and a timestamp corresponding to when the data was sent. The last sync token represents the latest knowledge that the consumer is aware of. Combined with the device id, and the timestamp, the provider may essentially know what knowledge each consumer has of its present state and when they knew it. Thus it is possible tell when all consumers are aware of a common level of knowledge of its data collection state, and thus which tombstones are now defunct and may therefore be safely expunged without leading to sync holes, when a consumer issues a sync request.

If there are no consumer devices issuing sync requests to a provider device, the provider may be able to expunge the record of tombstones the moment the deletes occur, as there is no remote consumer device that is dependent on having to be made aware of those tombstones. If there is only one consumer device syncing with the provider, the provider may be able to expunge all tombstones after the consumer is made aware of sync changes that have occurred at the provider. This is as the sole consumer after receiving the sync changes list is already aware of the tombstones, and the provider has no need to hang on to them. For the multiple consumer devices scenario the provider may only expunge set of tombstones that are in the denomination of sync changes that all consumer devices are aware of.

In one embodiment, if a consumer device has not been active for a set period, that is, has failed to make a sync request in a given time interval, it may be considered no longer part of the community of devices of which the provider evaluates, when determining what is the common denomination of sync change knowledge that all consumer devices are aware. This prevents a single device from holding hostage the process of the expunging of defunct tombstones.

FIGS. 3 through 7 give one example of a database maintained by a provider to a set of consumers. This example develops over time—as the consumers intermittently connect and/or request information regarding the state of the database. In FIG. 3, the same database state 202, as shown in FIG. 2, is given. In addition, information is maintained (possibly by the provider, or a separate controller in communication with the provider and/or consumers) in the form of table 204. Table 204 shows the set of consumers keeping active tabs on the state of the database, the last sync token received and an optional timestamp of the time of last sync. Tables 206, 208 and 210 maintain information regarding the sync token received and the sync changes received and/or otherwise noted by Consumers A, B and C, respectively—possibly after issuing a sync change request to provider with sync token 0. It will be appreciated that the information in tables 202, 204, 206, 208 and 210 may be maintained by the consumers themselves, the provider and/or a separate controller in either direct or indirect communication with the relevant entities.

As may be seen, consumers A, B and C start out in this scenario knowing about FileA through FileE in the database and that they have knowledge up to what is represented in Sync Token 5.

In FIG. 4, it may be seen that the provider state has changed (as seen in 202) and that FileA, FileB and FileD have been deleted, the contents of FileC have been edited and that new content (FileF, FileG and FileH) have been added. It should also be noted that the sync tokens have been correspondingly updated to reflect the changes. In addition, the sync tokens may be incremented such that it may reflect a sequence of the order that the changes occurred. At this time, it may be seen that none of Consumers A, B or C are yet aware of any of the sync changes have occurred.

In FIG. 5, it may be seen that, at this time, Consumers A and B have accomplished a sync; but Consumer C is offline and is not aware of any updates to the database. Tombstones at the provider and/or database may not be purged as there is an outstanding device (i.e., Consumer C) that is unaware of these changes. It may be seen in tables 206 and 208 the state of Consumers A and B knowledge, respectively, after they issued a sync change request with sync token 5.

In FIG. 6, it may be seen that, at this time, the database has purged the tombstones of FileA and FileB (with sync tokens 7 and 8). In addition, FileD was also deleted (as indicated by sync token 12). While Consumers A and B were able to sync up to sync token 12, Consumer C was only able to sync up to sync token 10 and is thus unaware of the tombstone for FileD (and thus, it is desirable to continue to keep it).

In FIG. 7, it may be seen that all consumers (A, B and C) are now all currently synced through sync token 12—and that all tombstones have now been deleted.

Figure 8:
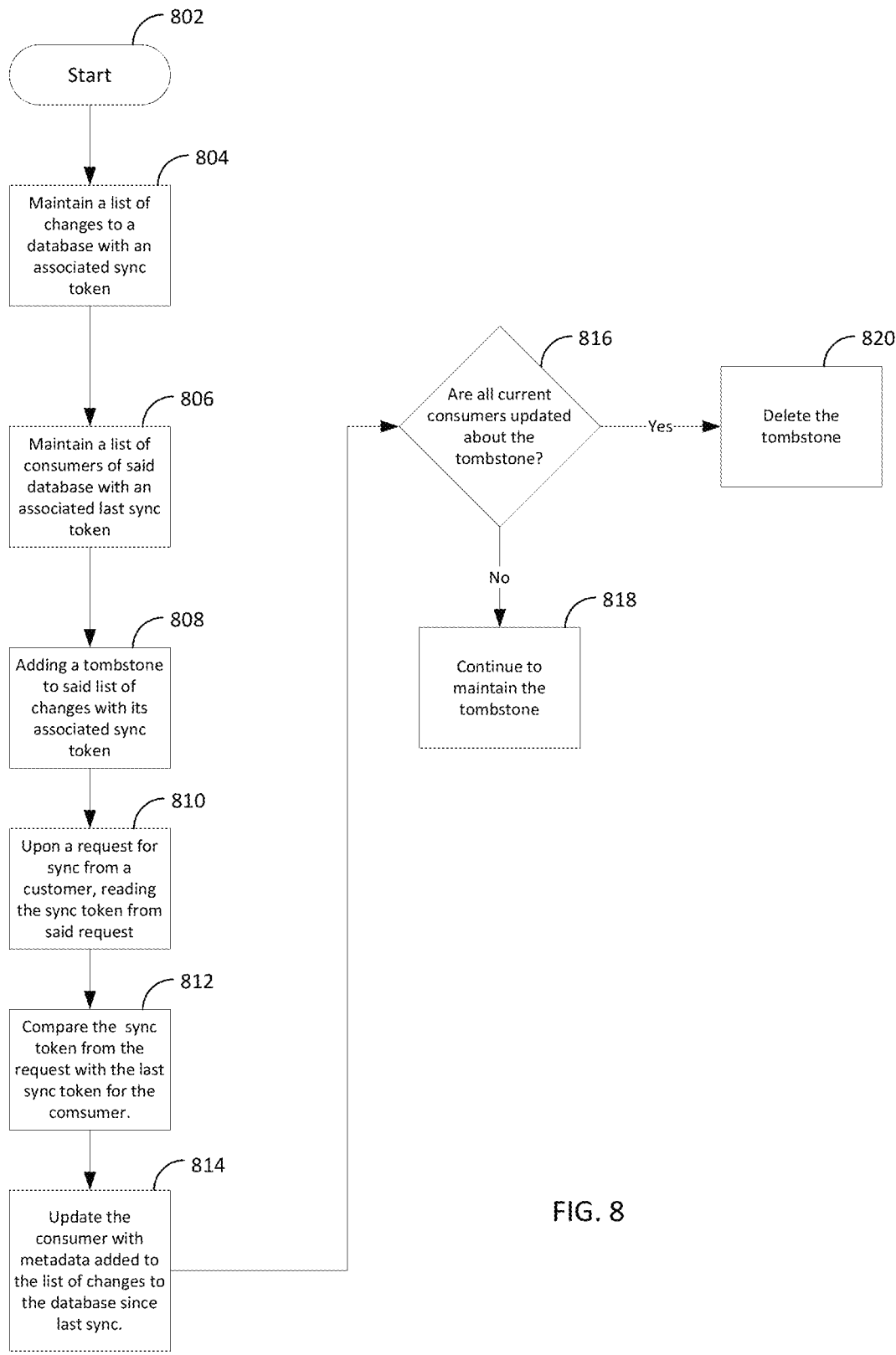
FIG. 8 is one flow chart embodiment of processes made in accordance to the principles of the present application.

FIG. 8 is merely one flowchart embodiment of maintaining the metadata of a database and its changes over time. This metadata (as depicted in the several examples above) may be managed by the producer (or other controller with suitable processing and memory) and accessed by consumers who may send requests for syncs to the database.

The flowchart starts at 802 and proceeds to 804 where a list of changes to a database is maintained with changes to any data, files or the like recorded with an associated sync token. At 806, a list of consumers may be maintained and each such consumer may have an associated last sync token, as described above. As with the management of databases, new consumers may be added to the list, if so requesting access and being granted access to the database. In addition, existing consumers may be denied further access to database for a host of security or other practical considerations.

At 808, if any data, file or the like is deleted from the database, then a tombstone (or any other suitable structure denoted the deletion) may be added to the list of changes, with a sync token associated with this deletion. At 810, a consumer may make a request for sync with the database. Such a request may be a request to access data from the database itself. Alternatively, this request may be a simple request for an update regarding the metadata itself—apart from or together with a request for data from the database. This request may also comprise a sync token (possibly encoded in the request), representing the last time that the consumer synced with this database. The consumer may be updated with metadata (and possibly, the actual data itself from the database) that was added or otherwise changed from the last sync at 814.

The producer (or other entity responsible for maintain the metadata of the database and/or database itself) may inquire as to whether all "current" consumers of the database and/or metadata is updated regarding any tombstone stored with the metadata and/or database. If so, then the tombstone may then be deleted. Otherwise, the tombstone is maintained until all consumers are so updated. In some embodiments, consumers who have not yet been updated should do so before a condition is met (such as the expiration of a time period). If the condition is met, then the consumer is no longer considered "current" or otherwise relevant—and the tombstone may then be deleted as well.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method performed on a provider that comprises at least one computing device, the method comprising:
    creating, by the provider in response to a data item that has been or is intended to be deleted from a database, a tombstone that is another data item that represents the data item that has been or is intended to be deleted from the database;
    receiving, by the provider from one of one or more consumer devices, a request related to the database;
    updating, by the provider in response to the received request, the one of the one or more consumers devices with any changes to the database since a last time the one of the one or more consumer devices was updated with the database;
    maintaining, by the provider, the tombstone in response to any of the one or more consumer devices not having been updated with changes to the database since the creation of the tombstone; and
    deleting, by the provider, the tombstone in response to all of the one or more consumer devices having been updated with the changes to the database since the creation of the tombstone.

2. The method of claim 1 where the created tombstone is maintained in a list of changes to the database until all of the one or more consumer devices have been made aware that the data item has been deleted.

3. The method of claim 1 further comprising maintaining, by the provider, a list of the one or more consumer devices.

4. The method of claim 3 further comprising deleting, by the provider from the list, references to any of the one or more consumer devices that have not been updated with the database upon expiration of a particular time period.

5. The method of claim 4 where the maintaining the tombstone and the deleting the tombstone is based on the one or more consumer devices in the list.

6. The method of claim 1 further comprising maintaining a last sync token for each of the one or more consumer devices, where each last sync token indicates a time at which the corresponding each of the one or more consumer devices was last updated with changes to the database.

7. The method of claim 1 where the received request is a request for sync with the database or a request to access data in the database.

8. A provider comprising:
    at least one computing device via which the provider creates, in response to a data item that has been or is intended to be deleted from a database, a tombstone that is another data item that represents the data item that has been or is intended to be deleted from the database;
    communications hardware via which the provider receives, from one of one or more consumer devices, a request related to the database;
    the communications hardware via which the provider updates, in response to the received request, the one of the one or more consumers devices with any changes to the database since a last time the one of the one or more consumer devices was updated with the database;
    the at least one computing device via which the provider maintains the tombstone in response to any of the one or more consumer devices not having been updated with changes to the database since the creation of the tombstone; and
    the at least one computing device via which the provider deletes the tombstone in response to all of the one or more consumer devices having been updated with the changes to the database since the creation of the tombstone.

9. The provider of claim 8 where the created tombstone is maintained in a list of changes to the database.

10. The provider of claim 8, the at least one computing device via which the provider maintains a list of the one or more consumer devices.

11. The provider of claim 10, the at least one computing device via which the provider deletes references to any of the one or more consumer devices that have not been updated with the database upon expiration of a particular time period.

12. The provider of claim 11 where maintaining the tombstone by the provider and deleting the tombstone by the provider is based on the one or more consumer devices in the list.

13. The provider of claim 8, the at least one computing device via which the provider maintains a last sync token for each of the one or more consumer devices, where each last sync token indicates a time at which the corresponding each of the one or more consumer devices was last updated with changes to the database.

14. At least one hardware computer-readable storage medium that comprises computer-executable instructions that, based on execution by at least one computing device of a provider, configure the provider to perform actions comprising:
    creating, by the provider in response to a data item that has been or is intended to be deleted from a database, a tombstone that is another data item that represents the data item that has been or is intended to be deleted from the database;

receiving, by the provider from one of one or more consumer devices, a request related to the database;

updating, by the provider in response to the received request, the one of the one or more consumers devices with any changes to the database since a last time the one of the one or more consumer devices was updated with the database;

maintaining, by the provider, the tombstone in response to any of the one or more consumer devices not having been updated with changes to the database since the creation of the tombstone; and deleting, by the provider, the tombstone in response to all of the one or more consumer devices having been updated with the changes to the database since the creation of the tombstone.

15. The at least one hardware computer-readable storage medium of claim 14 where the created tombstone is maintained in a list of changes to the database.

16. The at least one hardware computer-readable storage medium of claim 14 further comprising maintaining, by the provider, a list of the one or more consumer devices.

17. The at least one hardware computer-readable storage medium of claim 16 further comprising deleting, by the provider from the list, references to any of the one or more consumer devices that have not been updated with the database upon expiration of a particular time period.

18. The at least one hardware computer-readable storage medium of claim 17 where the maintaining the tombstone and the deleting the tombstone is based on the one or more consumer devices in the list.

19. The at least one hardware computer-readable storage medium of claim 14 further comprising maintaining a last sync token for each of the one or more consumer devices, where each last sync token indicates a time at which the corresponding each of the one or more consumer devices was last updated with changes to the database.

20. The provider of claim 8 where the received request is a request for sync with the database or a request to access data in the database.

* * * * *